United States Patent Office 3,430,056
Patented Feb. 25, 1969

3,430,056
DEVICES FOR COMPENSATING TEMPERATURE-DEPENDENT TRAVELING OF SPECTRUM LINES IN DIRECT-READING SPECTROSCOPES
Karl Pfeifer, Jena, Germany, assignor to VEB Carl Zeiss Jena, Jena, Gera, Germany
Filed Sept. 12, 1966, Ser. No. 579,457
U.S. Cl. 250—226        4 Claims
Int. Cl. G01j 3/34

ABSTRACT OF THE DISCLOSURE

In a direct reading spectroscope a line-mark carrier is secured to a slide which bears a plate containing the exit slit. Each mark of this carrier is inclined to correspond to the temperature gradient of a respective spectrum line. Photoelectric sensing means bring the exit slit into alignment with the spectrum lines to be analyzed and are so adjustable relatively to the carrier as to sense the line marks at a location corresponding to a definite temperature. A temperature datum line determines the temperature-dependent deviations of the sensing means from an adjusted reference position.

---

Figure 1:
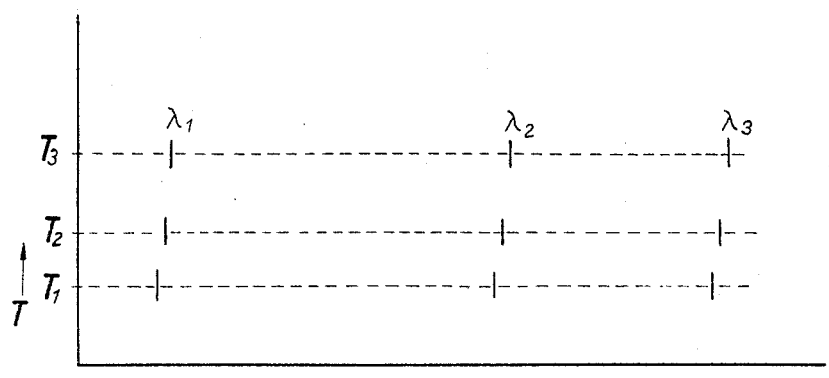

This invention relates to a device for compensating temperature-dependent traveling of the spectrum lines in directly readable spectroscopes.

Quantitative spectral analysis depends on the definition of the relationship that the light fluxes of two spectral lines have to one another. It is necessary, therefore, to isolate definite lines of the spectrum and to direct their light fluxes to a receiver. The isolation is generally effected by means of a plurality of exit slits arranged in the plane of the spectrum. In the so-called scanning method, however, only one slit is automatically set first on the one and then on the other spectrum line to be measured. The multiplicity of lines and the often very narrow intervals between two adjacent lines requires the exit slits to be set on the spectrum with a maximum of precision. Another matter for special consideration is the displacement of the lines which is due to variations of temperature and dependent on the wave-lengths.

In the known devices of the foregoing kind, automatic positioning of the exit slit is effected in such a manner that the exit slit in fixed connection with a photoelectric receiver is displaced in the spectrum plane by means of a motor-driven spindle. The positions of the successive stop points corresponding to the distance apart of the spectrum lines are fixed by adjustable mechanical stops or notches of a displaceable carrier. The moment a cam displaced together with the exit slit impacts a stop or notch of the carrier in its normal position, this carrier is taken along and an electric contact causes the instantaneous arrest of the exit slit. When the measuring period is over, the carrier reassumes its normal position, and the process is repeated at each following stop or notch.

Temperature variations at the spectrograph which are due to changes in the room temperature are followed up by changes in the position of the spectrum relative to the scanning system. A deviation of even a few tenths of a centigrade from the reference temperature will be quite sufficient so to derange the coincidence of line and exit slit as to falsify the result of the measurement. The displacement may be constant with respect to all lines, for example by employing gratings as disposing medium, so that the entire spectrum is translated in the spectrum plane. In this case the distance apart of any two lines is independent of temperature. In devices operating according to the scanning method such a translation can be corrected by an equal displacement of the adjusting rule. In known systems having fixed exit slits the correction can be achieved by a displacement of the entrance slit or by torsion of the grating.

In prism spectrographs, however, temperature differences cause a traveling of the spectrum lines which is dependent on wavelength, the line intervals therefore being dependent on temperature. The stop points of the exit slit which by means of the mechanical stops or notches are adjusted on the rule for a definite reference temperature, must accordingly be corrected in dependence on the respective positions of the spectrum lines and on the temperature if the apparatus is to function within a definite temperature interval in a nonconditioned room.

In the known devices of the scanning type, such wavelength-dependent correction is accomplished by a continuous displacement of the setting carrier, which is mechanically combined with the displacement of the exit slit, so that the correction displacement effected is always proportional to the path length covered by the exit slit, and the necessary dependence on the position of the line in the spectrum is complied with. The proportionality factor is the temperature difference from the relative temperature. This difference is measured at the apparatus, and the correction is adjusted by hand.

Of course, a device of this kind is only practicable if the temperature-dependent displacement of the spectrum lines is in linear dependence on their positions in the spectrum. Moreover, the measurement of the temperature only admits indirect deduction as to the real loci of the lines. This postulates exact temperature measurement at the optical elements of the spectrograph, which presents some difficulties for example at the comparatively voluminous dispersing prism. The measurement of the temperature introduces instability factors in the setting of the exit slit which can only be compensated by widening this slit, that is to say by a loss of resolving power.

The present invention aims at obviating the foregoing disadvantages particularly in spectroscopes for quantitative analysis by providing a device in which the exit slit is successively and with due precision positioned in alignment with the analysis lines in automatic relationship to the temperature-dependent traveling of all analysis lines, whereby this traveling may have any desired dependence on wave-length or on the position of the line in the spectrum without the necessity of temperature measurement.

To this end the present invention consists in a device for compensating temperature-dependent displacement of the spectrum lines in directly readable spectroscopes, wherein the spectrum lines to be analysed are simulated as line marks on a carrier, each line mark having an inclination corresponding to the temperature gradient of the spectrum line it simulates, and wherein means are included for sensing the line marks on the carrier while the exit slit is being displaced for setting on the spectrum line to be analysed, the sensing taking place at such a location at the line marks on the carrier that the exit slit is stopped at a position corresponding to the respective temperature.

The length of the line marks corresponds to a definite pre-established temperature difference. The possibility of continuously adjusting the sensing height provides a simulation of the interesting line intervals in the spectrum in dependence on the temperature.

To obtain the correct sensing height corresponding to temperature conditions, a particularly temperature-sensitive spectrum line—the temperature datum line—can during the advance motion of the exit slit be used to arrest this slit at the momentary position of the said line by means of the photoelectric signal which is released when the said line is sensed. Resulting deviations of a reference position once adjusted can be viewed for example through a microscope and are a measure of the necessary correction of the sensing height.

In one embodiment of the device according to the invention the simulations of the analysis lines are applied to a quartz or glass body covered by a metal coating into which fine light-transmitting slits of different inclinations are cut at appropriate intervals. In another embodiment, an uncoated carrier has opaque line marks applied to it in a manner similar to that of glass rules. These two embodiments offer the possibility of photoelectric scanning. Both the exit slit and the body containing the simulation of the analysis lines are jointly moved past a photoelectric scanner, or, reversely, a photoelectric scanner is moved past a body and a slit. The correct scanning height can be adjusted by displacing the glass or quartz body at right angles to the direction of the exit-slit motion. Here, again, the reverse is possible.

Figure 2:
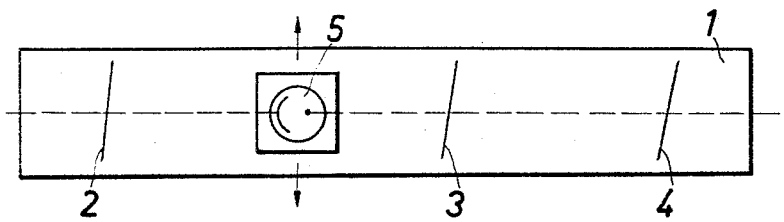
Figure 3:
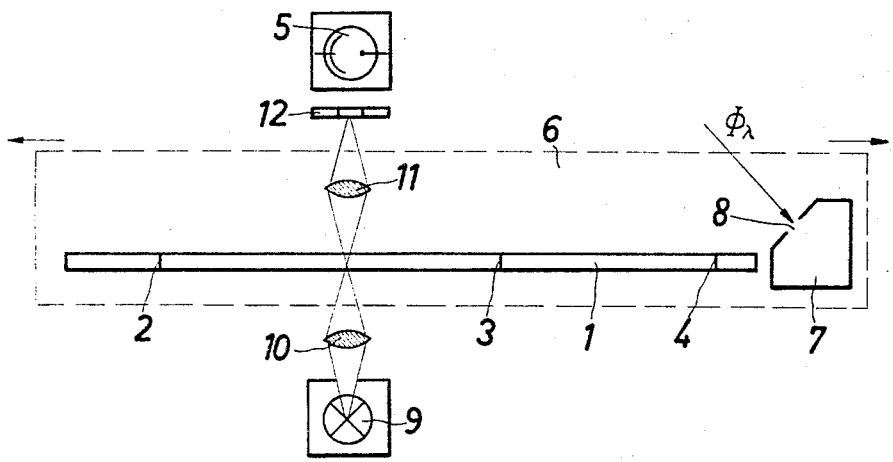
Figure 4:
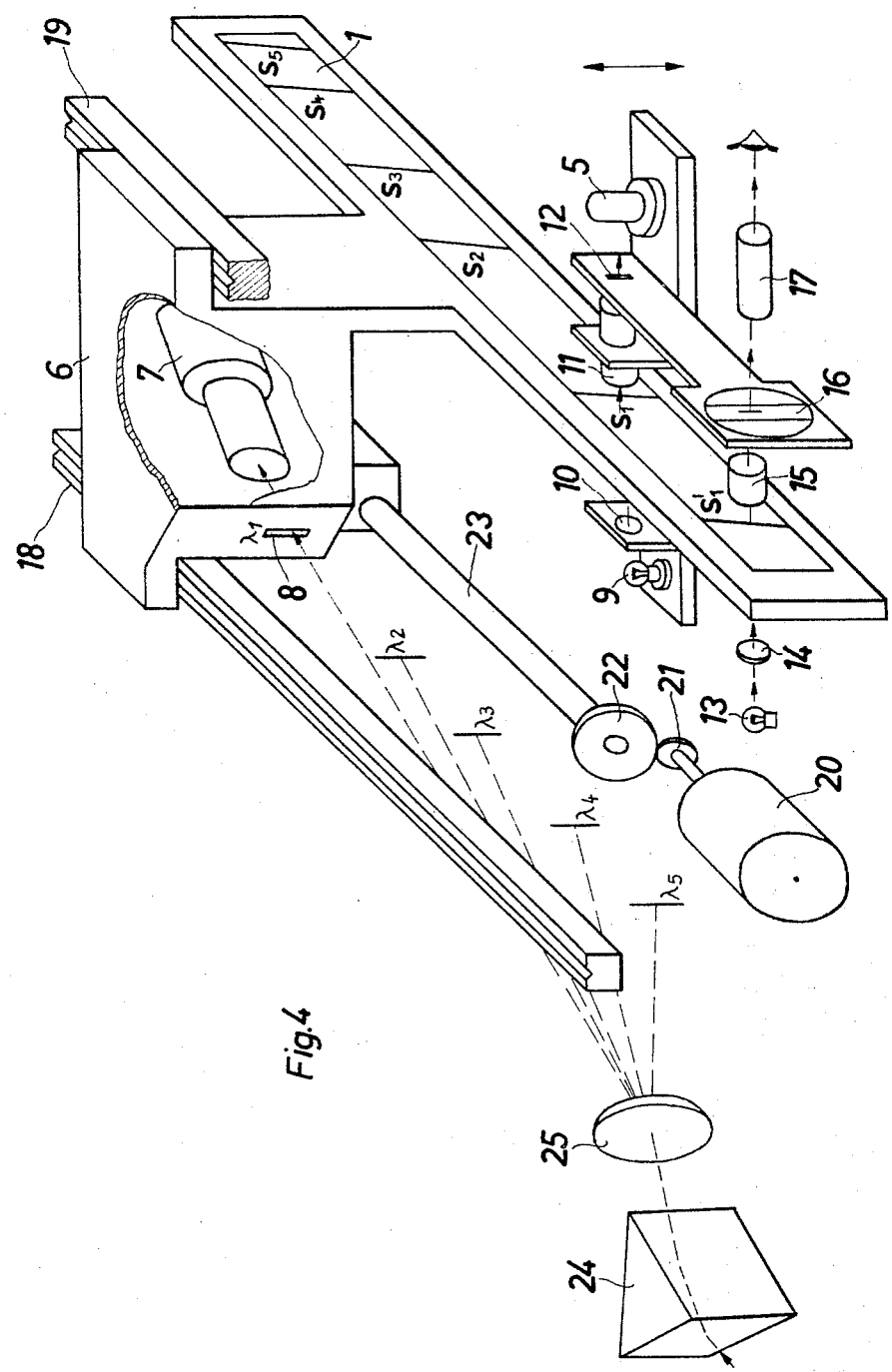

In order that the invention may be more readily understood, reference is made to the accompanying drawings in which FIG. 1 shows the temperature-dependent change of three analysis lines, FIG. 2 shows a line-mark carrier of transparent material, FIG. 3 shows a line-mark carrier in a measuring apparatus for quantitative spectrum analysis and FIG. 4 shows a particular embodiment of a device according to the invention.

Referring to the drawings, FIG. 1 illustrates how the positions and the distances of three different analysis lines $\lambda 1$, $\lambda 2$ and $\lambda 3$ in a spectrum change are dependent on temperature. The positions of these lines are shown in respect to temperatures $T_1$, $T_2$ and $T_3$.

In FIG. 2, a carrier 1 of transparent material, for example glass, bears line marks 2, 3 and 4 respectively coordinated to the analysis lines $\lambda 1$, $\lambda 2$ and $\lambda 3$ in FIG. 1. The inclination of the marks 2, 3 and 4 relative to the transverse diameter of the carrier 1 corresponds to the temperature dependence shown in FIG. 1 in respect of the analysis lines $\lambda 1$, $\lambda 2$ and $\lambda 3$.

The carrier 1 is scanned by means of a scanner comprising a photoelectric cell 5, past which the carrier 1 is moved. The correct scanning height for a definite temperature can be adjusted by changing the height of the scanner in the directions indicated by arrows.

In FIG. 3, a spindle (not shown) displaces a slide 6 for adjustment in the directions of the arrows. Secured to the slide 6 are a line-mark carrier 1 at right angles to it, and a photo-electron multiplier 7 for measuring the light fluz $\Phi 98A\gamma$ of the analysis lines. A slit 8 is mounted in a fixed connection in front of the multiplier 7. A light source 9 and a convergent lens 10 are disposed at the one side of the line-mark carrier 1, and a convergent lens 11, a plate 12 with two line marks, and a photoelectric cell 5 are disposed at the other side. The parts 5, 9, 10, 11 and 12 constitute a photoelectric scanner. The scanner is set at the scanning height appropriate to the temperature at which the measurement takes place. This setting is only possible at right angles to the slide motion indicated by arrows.

In FIG. 4, the parts essential to a device according to the invention are illustrated in co-operative relationship to one another, the parts which correspond to parts in the foregoing description being referred to by corresponding numerals. A slide 6 is displaceable along two guides 18, 19 by means of a motor 20, gearwheels 21, 22 and a spindle 23. A photo-electron multiplier 7, an exit slit 8 and a line-mark carrier 1 are secured to the slide 6. A prism 24 of the spectrograph and an optical system 25 image the analysis lines $\lambda 1 \ldots \lambda 5$. In FIG. 4, the line $\lambda 1$ is shown imaged in the exit slit 8. Line marks $S_1 \ldots S_5$ on the carrier 1, which correspond to the analysis lines $\lambda 1 \ldots \lambda 5$, are sensed by means of a photoelectric scanner which comprises a light source 9, an optical illumination system 10, an optical imaging system 11, a slit 12, and a photoelectric cell 5, and which is displaceable parallel to the line-mark carrier 1 in the directions of the arrow. Secured to the scanner is a double-lined graticule 16 and a microscopic observation system made up of a light source 13, an optical illumination system 14, an optical imaging system 15 and an eyepiece 17. In the drawing, the observation system 13, 14, 15, 17 is shown adjusted relatively to an additional line mark $S_1$, of the analysis line $\lambda_1$, which serves as temperature datum line, the image of the mark $S_1'$ having to lie between and at equal distances from the two lines of the double-lined graticule 16.

If the temperature is constant and of no interest as to its absolute value, the following coincidence is to be set:

(a) The spectrum line lies symmetrically in the exit slit, (b) The simulation of this line on the line-mark carrier is captured by the photoelectric scanner, (c) The additional line mark of the same line, viewed through the microscope, lies within a double line in the microscope.

After this setting, the correct scanning height is adjusted and maintained simply by the capture of the additional line mark in between the double line of the microscope. The device can be further improved by replacing the microscopical viewing by a photoelectric scanner which automatically sets the correct scanning height when the control process is arbitrarily released by hand. Also it is possible, by means of an auxiliary split and a servo-unit, continuously to follow the position of a temperature datum line and, by means of an adjusting element controlled by the servo-unit, continuously to maintain the correct value of the scanning height.

I claim:

1. A device for compensating temperature-dependent displacement of spectrum lines in a directly readable spectroscope made up of at least a slide carrying a photoelectron multiplier and an exit slit, said slide being displaceable for adjustment of said slit relative to a desired spectrum line, said device comprising a transparent carrier which is secured to said slide and bears line marks simulating the spectrum lines to be analyzed, each of said line marks lying in a plane parallel to the plane of and so inclined relatively to said spectrum lines as corresponds to the temperature gradient of the spectrum line it simulates, and photoelectric means for sensing said line marks simultaneously with a displacement of said slit into alignment with the spectrum line to be analyzed, said photoelectric sensing means being so adjustable in a plane parallel to said carrier as to sense line marks at a location corresponding to a definite temperature.

2. A device as claimed in claim 1, wherein said carrier has a metal coating in which said line marks are formed by light-transmitting slits.

3. A device as claimed in claim 1, wherein said carrier bears opaque line marks.

4. A device as claimed in claim 1, wherein a particularly temperature-sensitive spectral line serves as a temperature datum line for the determination of temperature-dependent deviations of said photoelectric sensing means from an adjusted reference position, said carrier bearing an additional line mark corresponding to said datum line, said sensing means bearing a double-lined graticule, and said double-lined graticule and said additional line mark being adapted conjointly to adjust said sensing means relatively to said carrier.

References Cited

UNITED STATES PATENTS 3,080,788   3/1963   Saunderson _____ 88—14

JAMES W. LAWRENCE, *Primary Examiner.*

D. O'REILLY, *Assistant Examiner.*

U.S. Cl. X.R.

88—14